(12) United States Patent
An et al.

(10) Patent No.: US 11,946,868 B2
(45) Date of Patent: Apr. 2, 2024

(54) CONCENTRATION GRADIENT FLUORESCENCE CALIBRATION SHEET FOR LASER MICROARRAY CHIP SCANNER AND CALIBRATION METHOD

(71) Applicants: CHENGDU CAPITALBIO MEDIAB LTD., Sichuan (CN); MIANYANG PEOPLE'S HOSPITAL, Sichuan (CN)

(72) Inventors: Shuang An, Sichuan (CN); Guanbin Zhang, Sichuan (CN); Dong Liang, Sichuan (CN); Shuying Zhao, Sichuan (CN)

(73) Assignees: CHENGDU CAPITALBIO MEDIAB LTD, Sichuan (CN); MIANYANG PEOPLE'S HOSPITAL, Sichuan (CN)

( * ) Notice: Subject to any disclaimer, the term of this patent is extended or adjusted under 35 U.S.C. 154(b) by 152 days.

(21) Appl. No.: 17/595,036

(22) PCT Filed: Apr. 23, 2020

(86) PCT No.: PCT/CN2020/086375
§ 371 (c)(1),
(2) Date: Nov. 5, 2021

(87) PCT Pub. No.: WO2021/098142
PCT Pub. Date: May 27, 2021

(65) Prior Publication Data
US 2022/0307982 A1  Sep. 29, 2022

(30) Foreign Application Priority Data
Nov. 21, 2019 (CN) .......................... 201911148674.5

(51) Int. Cl.
*G01N 21/64* (2006.01)

(52) U.S. Cl.
CPC . *G01N 21/6456* (2013.01); *G01N 2021/6463* (2013.01)

(58) Field of Classification Search
CPC ....... G01N 21/6456; G01N 2021/6463; G01N 21/6452; G01N 21/278
See application file for complete search history.

(56) References Cited

U.S. PATENT DOCUMENTS

| | | | |
|---|---|---|---|
| 2003/0105195 A1 | 6/2003 | Holcomb et al. | |
| 2004/0012676 A1* | 1/2004 | Weiner ................. | G01N 21/253 348/331 |

(Continued)

FOREIGN PATENT DOCUMENTS

| | | |
|---|---|---|
| CN | 1588006 A | 3/2005 |
| CN | 1231760 C | 12/2005 |

(Continued)

OTHER PUBLICATIONS

Translation of CN 108444966 (Year: 2018).*
Translation of CN108444966A (Year: 2018).*

*Primary Examiner* — David P Porta
*Assistant Examiner* — Mamadou Faye
(74) *Attorney, Agent, or Firm* — Yue (Robert) Xu; Apex Attorneys at Law, LLP

(57) ABSTRACT

A concentration gradient fluorescence calibration sheet has a glass substrate and an inorganic nano fluorescent liquid lattice disposed on a surface of the glass substrate. The inorganic nano fluorescent liquid lattice has a plurality of inorganic nano fluorescent liquid sub-lattices. Inorganic fluorescent mixed liquid droplets of each inorganic nano fluorescent liquid sub-lattice are arranged in A rows×B columns. The solution concentration of the same row of inorganic nano fluorescent liquid droplets in the inorganic nano fluorescent liquid sub-lattices is the same, and the solution concentrations of two adjacent rows of inorganic (Continued)

nano fluorescent liquid droplets change in multiples. The concentration gradient fluorescence calibration sheet for the laser microarray chip scanner is utilized to calibrate a scanner under test and a first row of inorganic nano fluorescent liquid droplets in the inorganic nano fluorescent liquid sub-lattices are taken as index marks.

9 Claims, 3 Drawing Sheets

(56) References Cited

U.S. PATENT DOCUMENTS

| | | | |
|---|---|---|---|
| 2006/0063274 A1 | 3/2006 | Schremp et al. | |
| 2011/0318226 A1* | 12/2011 | Ge | G01N 21/278 422/63 |
| 2016/0181060 A1* | 6/2016 | Randolph | G02B 21/365 250/307 |

FOREIGN PATENT DOCUMENTS

| | | | |
|---|---|---|---|
| CN | 108444966 A * | 8/2018 | |
| CN | 108444966 A | 8/2018 | |
| CN | 110146477 A | 8/2019 | |
| CN | 110865058 A | 3/2020 | |
| WO | WO-2010111691 A2 * | 9/2010 | C07H 19/20 |

* cited by examiner

CONCENTRATION GRADIENT FLUORESCENCE CALIBRATION SHEET FOR LASER MICROARRAY CHIP SCANNER AND CALIBRATION METHOD

TECHNICAL FIELD

The present invention belongs to the technical field of biochip production equipment, and relates to a concentration gradient fluorescence calibration sheet for a laser microarray chip scanner configured to calibrate the linear range, flexibility and definition of a red and green dual laser microarray chip scanner and a calibration method.

BACKGROUND

With the rapid development of biotechnology, the electronic technology and biotechnology have been combined to produce a derivative product of a semiconductor chip—biochip. This will bring about a profound revolution in our lives, which will make immeasurable contributions to the sustainable development around the world.

The biochip has been researched between 1997 and 1998 in China. Although the research starts late, the technology and industry develop rapidly, this makes a phased breakthrough from nothing and gradually develops stronger. The biochip has stepped into the technology application and product sales stage from the stages of technical research and product development, making great achievements in the related equipment researches in expression profile chip, serious disease diagnosis chip and biochip. In 2008, the biochip market was worth about USD 100 million in China, and increased at a speed of over 20%. To 2020, the biochip market would reach USD 900 million.

The microarray chip scanner is just a detecting instrument that is used for microarray chip scanning and plays an extremely important role. A light source, light path and detection system of the scanner will slightly vary as the time delays, which will usually bring about a measurement error. However, a fluorescence detection method is extremely high in sensitivity, and a tiny detection error may cause the completely opposite conclusion during trace detection. Therefore, it is extremely necessary to prepare the concentration gradient calibration sheet to calibrate the microarray chip scanner.

At present, materials commonly used as fluorescent calibration mainly include organic fluorescent materials, polymer doped organic fluorescent materials, high polymer materials, inorganic material doped organic fluorescent materials, and inorganic ion doped inorganic solid materials. Preparation of the calibration sheet by the inorganic fluorescent material is slightly complicate in operation and slightly high in cost. However, it features constant fluorescence-emission property and good repeatability and consistency under long-time laser radiation due to special resistance to photobleaching thereof. With increasingly expanding biochip market and growing scanner demand, there is a necessity to produce a concentration gradient fluorescence calibration sheet which is easy to prepare and low in cost to make it more suitable for promotion and application.

SUMMARY

The present invention aims to overcome the problems in the prior art, and provides a concentration gradient fluorescence calibration sheet for a laser microarray chip scanner which is easy to operate a preparation method, short in production period and low in cost and a calibration method.

One aspect of the present invention provides a concentration gradient fluorescence calibration sheet for a laser microarray chip scanner, the concentration gradient fluorescence calibration sheet comprising a glass substrate and an inorganic nano fluorescent liquid lattice disposed on a surface of the glass substrate;

the inorganic nano fluorescent liquid lattice comprises a plurality of inorganic nano fluorescent liquid sub-lattices; inorganic fluorescent mixed liquid droplets of each inorganic nano fluorescent liquid sub-lattice are arranged in A rows×B columns, a solution concentration of the same row of inorganic nano fluorescent liquid droplets in the inorganic nano fluorescent liquid sub-lattices is the same, and the solution concentrations of two adjacent rows of inorganic nano fluorescent liquid droplets change in multiples, wherein A is 5-20, and B is 10-40.

According to one embodiment of the concentration gradient fluorescence calibration sheet for the laser microarray chip scanner provided by the present application, the glass substrate is chemically modified or coated with a polymeric membrane on a surface thereof.

According to one embodiment of the concentration gradient fluorescence calibration sheet for the laser microarray chip scanner provided by the present invention, the inorganic nano fluorescent liquid lattice comprises 1-8 inorganic nano fluorescent liquid sub-lattices which are uniformly distributed and arranged on the glass substrate.

According to one embodiment of the concentration gradient fluorescence calibration sheet for the laser microarray chip scanner provided by the present invention, an array spacing between the adjacent inorganic nano fluorescent liquid sub-lattices is the same, and a dot spacing between the adjacent inorganic nano fluorescent liquid sub-lattices is the same and is greater than or equal to 350 μm.

According to one embodiment of the concentration gradient fluorescence calibration sheet for the laser microarray chip scanner provided by the present invention, the solution concentrations of a first row of inorganic nano fluorescent liquid droplets and a last row of inorganic nano fluorescent liquid droplets in the inorganic nano fluorescent liquid sub-lattice are maximum, the solution concentrations have a linear relation of increasing in positive multiples from a second row of inorganic nano fluorescent liquid droplets to the last but one inorganic nano fluorescent liquid droplets, and a sensitivity is smaller than or equal to 12 concentration gradients.

According to one embodiment of the concentration gradient fluorescence calibration sheet for the laser microarray chip scanner provided by the present invention, the phosphor dot signal values of the first row of inorganic nano fluorescent liquid droplets and a last row of inorganic nano fluorescent liquid droplets are 65535 maximally, a phosphor dot signal value of the second row of inorganic nano fluorescent liquid droplets is 1000-3000, and a phosphor dot signal value of the last but one inorganic nano fluorescent liquid droplets is 60000-65535.

Another aspect of the present invention provides a calibration method for a laser microarray chip scanner, a concentration gradient fluorescence calibration sheet for the laser microarray chip scanner is utilized to calibrate a scanner under test, and a first row of inorganic nano fluorescent liquid droplets in the inorganic nano fluorescent liquid sub-lattices are taken as index marks.

According to one embodiment of the calibration method for the laser microarray chip scanner, a phosphor dot signal value of every inorganic nano fluorescent liquid droplet in the inorganic nano fluorescent liquid sub-lattice is taken as a single measurement value of a corresponding solution concentration, a diagram is made by taking a logarithmic value of the phosphor dot signal value of the corresponding every inorganic nano fluorescent liquid droplet thereof as a horizontal ordinate after the concentration gradient fluorescence calibration sheet is scanned by a standard scanner, and taking a logarithmic value of the phosphor dot signal value of the corresponding every inorganic nano fluorescent liquid droplet thereof as a longitudinal coordinate after the concentration gradient fluorescence calibration sheet is scanned by a scanner under test, and a correlation coefficient $R^2$ of a linear relation between curves is obtained through investigation.

According to one embodiment of the calibration method for the laser microarray chip scanner provided by the present invention, every scanner under test is calibrated by at least three groups of different scanning parameters, and when a correlation coefficient $R^2$ of every group of scanning parameters is greater than 0.90, the scanner under test has a normal calibration result and can be used in good condition.

Compared with the prior art, the present invention provides the concentration gradient fluorescence calibration sheet for the laser microarray chip scanner and a calibration method thereof, wherein a preparation method thereof is easy to operate, short in production period, low in cost, good in calibration effect and good in promotion and application prospects.

DESCRIPTION OF THE PREFERRED EMBODIMENT

All of the features disclosed in the Description, or all of the steps of any method or process so disclosed, may be combined in any way, except combinations where such features and/or steps are mutually exclusive.

Any feature disclosed in the Description can be replaced with other equivalent or similar features, unless otherwise specified, that is, each feature is only an example of series of equivalent or similar features, unless otherwise specified.

In accordance with the exemplary embodiment of the present invention, the concentration gradient fluorescence calibration sheet for the laser microarray chip scanner comprises a glass substrate and an inorganic nano fluorescent liquid lattice disposed on a surface of the glass substrate. The inorganic nano fluorescent liquid provided by the present invention is preferably made from a Nanobrite inorganic nano fluorescent material—a patent product from CAPITALBIO, which features long fluorescent lifetime, sharp emission spectrum, very stable luminescence (free of photobleaching and flickering), large Stokes and anti-Stokes displacements, high chemical stability and low biotoxicity. See the Chinese patent CN1231760C *Rare Earth Nano Particle for Biological Material Label and Preparing Method and Use Thereof* for more details, but the present invention is not limited to this. Preferably, the glass substrate is chemically modified or coated with a polymeric membrane on a surface thereof. At the time of preparation, the glass substrate chemically modified with the glass substrate or coated with the polymeric membrane on the surface thereof is sprayed with the inorganic nano fluorescent liquid to form the inorganic nano fluorescent liquid lattice.

Figure 1:
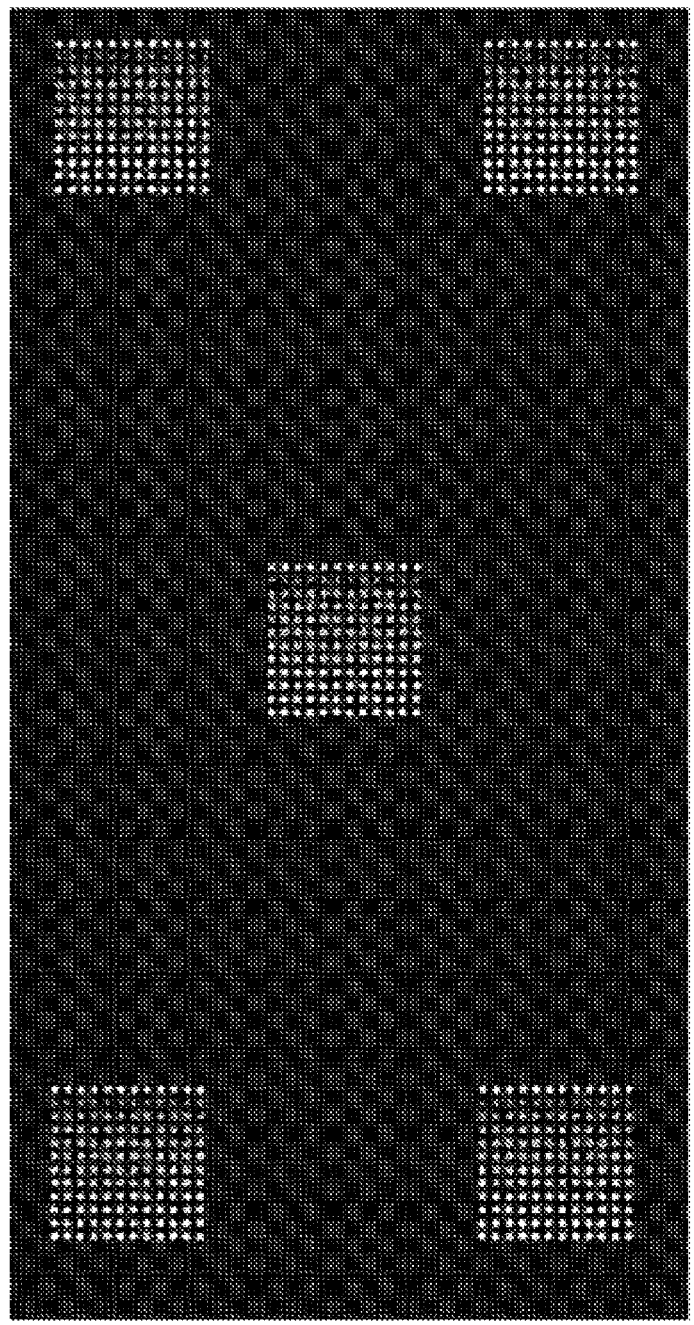
FIG. 1 illustrates a scannogram of an inorganic nano fluorescent liquid lattice in a concentration gradient fluorescence calibration sheet for a laser microarray chip scanner according to an exemplary embodiment of the present invention.
Figure 2:
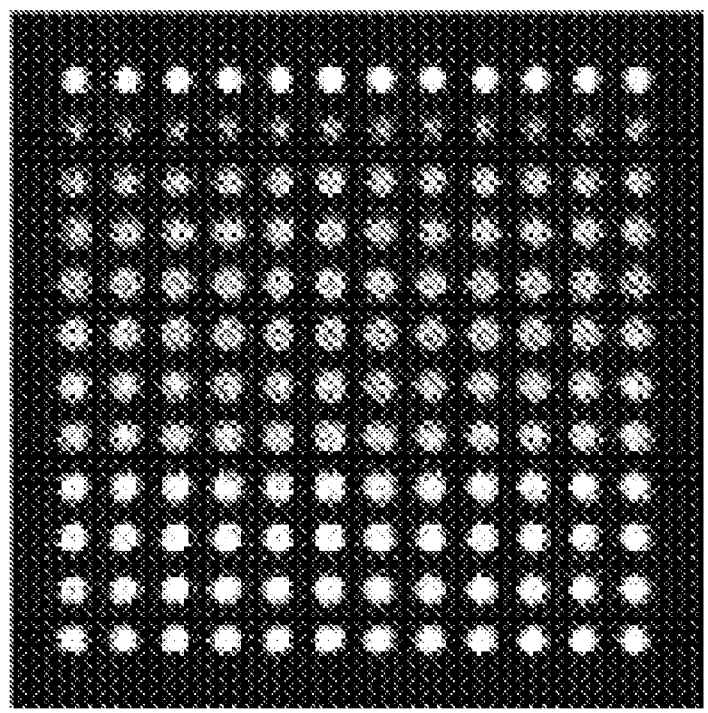
FIG. 2 illustrates a scannogram of an inorganic nano fluorescent liquid sub-lattice in a concentration gradient fluorescence calibration sheet for a laser microarray chip scanner according to an exemplary embodiment of the present invention.

FIG. 1 illustrates a scannogram of the inorganic nano fluorescent liquid lattice in the concentration gradient fluorescence calibration sheet for the laser microarray chip scanner according to the exemplary embodiment of the present invention; FIG. 2 illustrates a scannogram of the inorganic nano fluorescent liquid sub-lattice in the concentration gradient fluorescence calibration sheet for the laser microarray chip scanner according to the exemplary embodiment of the present invention.

As shown in FIGS. 1 and 2, the inorganic nano fluorescent liquid lattice comprises a plurality of inorganic nano fluorescent liquid sub-lattices; inorganic fluorescent mixed liquid droplets of each inorganic nano fluorescent liquid sub-lattice are arranged in A rows×B columns, wherein A is 5-20, and B is 10-40. Preferably, the inorganic nano fluorescent liquid lattice comprises 1-8 inorganic nano fluorescent liquid sub-lattices which are uniformly distributed and arranged in the glass substrate. At the time of preparation, an array spacing between the adjacent inorganic nano fluorescent liquid sub-lattices is controlled to be the same, and a dot spacing between the adjacent inorganic nano fluorescent liquid sub-lattices to be the same and greater than or equal to 350 μm.

A solution concentration of a same row of inorganic nano fluorescent liquid droplets in the inorganic nano fluorescent liquid sub-lattice is necessarily controlled to be the same, and the solution concentrations of the adjacent two inorganic nano fluorescent liquid droplets to increase or decrease gradiently in multiples.

Preferably, the solution concentrations of a first row of inorganic nano fluorescent liquid droplets and a last row of inorganic nano fluorescent liquid droplets in the inorganic nano fluorescent liquid sub-lattice are maximum, the solution concentrations have a linear relation of increasing in positive multiples from the second row of inorganic nano fluorescent liquid droplets to the last but one inorganic nano fluorescent liquid droplets, and a concentration gradient of the solution in the same inorganic nano fluorescent liquid sub-lattice is smaller than or equal to 12 concentration gradients.

According to one embodiment of the present invention, the phosphor dot signal values of a first row of inorganic nano fluorescent liquid droplets and a last row of inorganic nano fluorescent liquid droplets are 65535 maximally, a phosphor dot signal value of the second row of inorganic nano fluorescent liquid droplets is 1000-3000, and a phosphor dot signal value of the last but one inorganic nano fluorescent liquid droplets is 60000-65535. Due to the fact that the concentration of the used inorganic nano fluorescent liquid may vary according to different testing requirements, the varying multiples and specific concentrations cannot be defined directly, and defined in a range of phosphor dot signal values here.

On the basis of the above concentration gradient fluorescence calibration sheet, the present invention provides a calibration method for a laser microarray chip scanner, specifically a concentration gradient fluorescence calibration sheet for the laser microarray chip scanner is utilized to calibrate a scanner under test and a first row of inorganic nano fluorescent liquid droplets in the inorganic nano fluorescent liquid sub-lattices are taken as index marks.

At the time of actual calibration, a phosphor dot signal value of every inorganic nano fluorescent liquid droplet in the inorganic nano fluorescent liquid sub-lattice is taken as a single measurement value of a corresponding solution concentration, a diagram is made by taking a logarithmic value of the phosphor dot signal value of the corresponding every inorganic nano fluorescent liquid droplet thereof as a horizontal ordinate after the concentration gradient fluorescence calibration sheet is scanned by a standard scanner, and taking a logarithmic value of the phosphor dot signal value of the corresponding every inorganic nano fluorescent liquid droplet thereof as a longitudinal coordinate after the concentration gradient fluorescence calibration sheet is scanned by a scanner under test, and a correlation coefficient $R^2$ of a linear relation between curves is obtained through investigation.

Every scanner under test is calibrated by at least three groups of different scanning parameters, and when a correlation coefficient $R^2$ of every group of scanning parameters is greater than 0.90, the scanner under test has a normal calibration result and can be used in good condition, otherwise has an abnormal calibration result and cannot be used.

The following specific embodiments are given to further illustrate the present invention and are not intended to limit the scope thereof.

Embodiment: Preparation of 12 rows×12 columns concentration gradient fluorescence calibration sheet A glass substrate of the calibration sheet is chemically modified on a surface thereof and has a size of 75.6×25 mm. A surface of the calibration sheet is disposed with an inorganic nano fluorescent liquid in a lattice manner, and the inorganic fluorescent liquid is made from a Nanobrite inorganic nano fluorescent material—a patent product from CAPITALBIO. The glass substrate which is chemically modified or coated with the polymeric membrane on the surface thereof is horizontally placed, the inorganic nano fluorescent liquid is sprayed and uniformly distributed and arranged in a five-lattice manner on the glass substrate, every sub-lattice is a 12 rows×12 columns matrix, an array spacing between the adjacent sub-lattices is the same, and a dot spacing between the adjacent sub-lattices is the same and greater than or equal to 350 µm. A solution concentration of a same row of inorganic nano fluorescent liquid droplets of each sub-lattice is the same, a fluorochrome concentration contained in every row from the second row increases sequentially, and a concentration gradient sheet for calibration and measurement of a red and green dual laser microarray chip scanner is prepared by taking the first row of inorganic nano fluorescent liquid droplets as index marks.

Specifically, a multiple relation between the solution concentrations of the inorganic nano fluorescent liquid sub-lattices is a linear relation that the first row and a $12^{th}$ row have the maximum concentration (phosphor dot signal value: 65535), and the solution concentrations of the second row (phosphor dot signal value: 1000-3000) to the 11th row (phosphor dot signal value: 60000-65535) fluorescent liquid droplets increase in positive multiples.

When a correlation coefficient $R^2$ of the linear relation is greater than 0.90, a phosphor dot signal value of every inorganic fluorescent mixed liquid droplet is taken as a single measurement value of a corresponding concentration; a diagram is made by taking a logarithmic value of the phosphor dot signal value of the corresponding every inorganic nano fluorescent mixed liquid droplet thereof as a horizontal ordinate after the concentration gradient fluorescence calibration sheet is scanned by a standard scanner, and by taking a logarithmic value of the phosphor dot signal value of the corresponding every inorganic nano fluorescent liquid droplet thereof as a longitudinal coordinate after the concentration gradient fluorescence calibration sheet is scanned by a scanner under test; and a correlation coefficient $R^2$ of a linear relation between curves is obtained through investigation.

The scanner is specifically calibrated by the concentration gradient fluorescence calibration sheet as follows:

using the standard scanner and the scanner under test to scan with the following three groups of scanning parameters: first group: laser strength: −50%, PMT: −650; second group: laser strength: −60%, PMT: −650; third group: laser strength: −70%, PMT: −650.

Phosphor dots with signal saturation (signal value: 65535) are removed from the phosphor dot signal values extracted from the three groups of scanning parameters. See the Table 1 below for the specific data.

A diagram is made by taking a logarithmic value of the corresponding every phosphor dot signal value as a horizontal ordinate after the concentration gradient fluorescence calibration sheet is scanned by a standard scanner, and taking a logarithmic value of the corresponding every phosphor dot signal value as a longitudinal coordinate after the concentration gradient fluorescence calibration sheet is scanned by a scanner under test, and a correlation coefficient $R^2$ of a linear relation between curves is obtained through investigation. See FIGS. 1-3 for specific data images.

Figure 3:
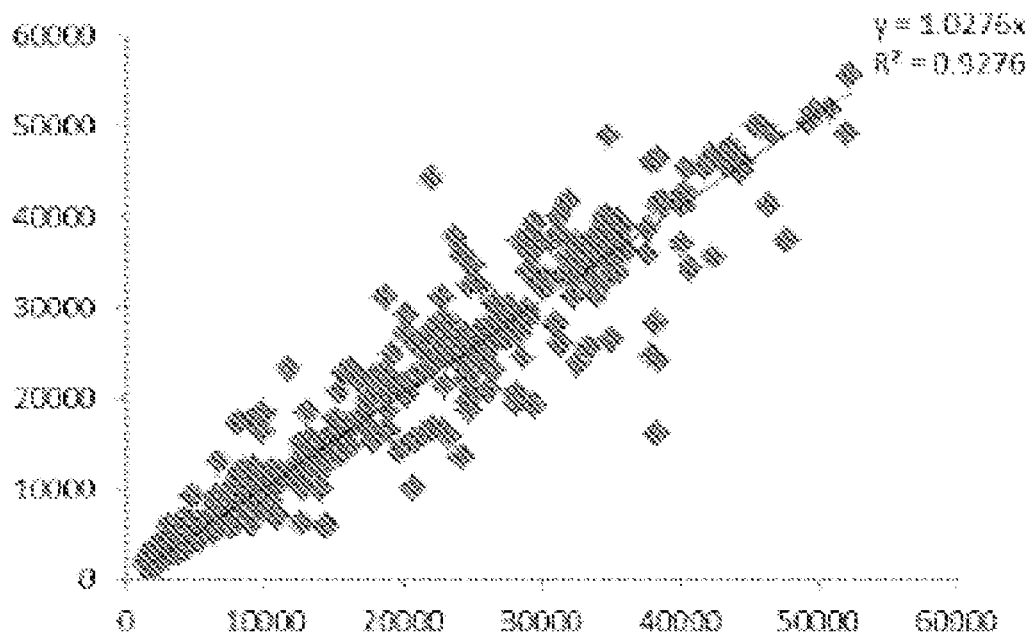
FIG. 3 illustrates a linear calibration relation diagram of a first group of parameters in Embodiment 1.
Figure 4:
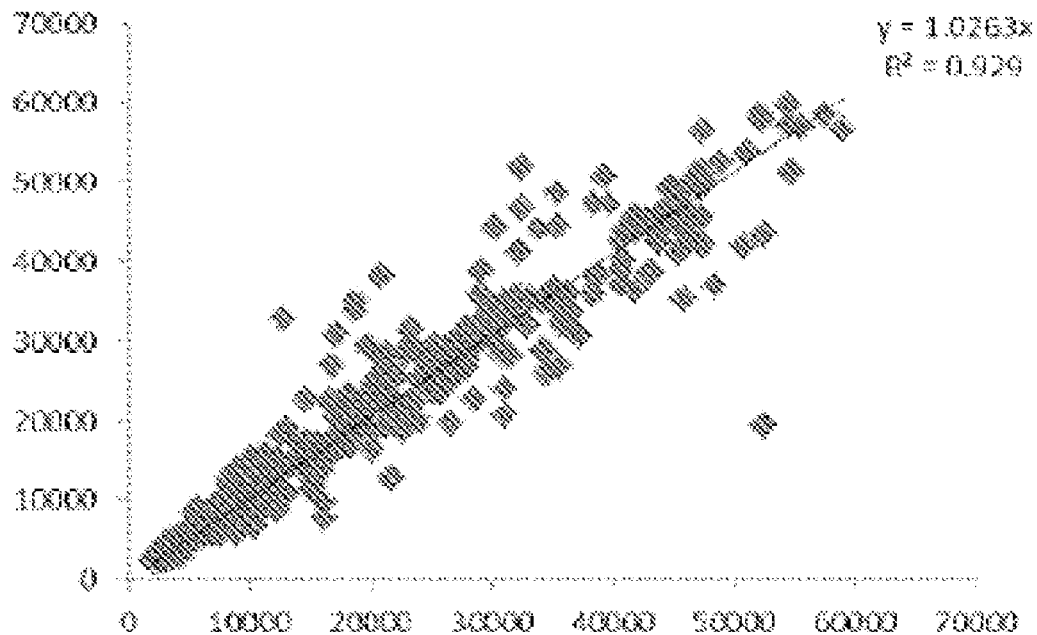
FIG. 4 illustrates a linear calibration relation diagram of a second group of parameters in Embodiment 1.
Figure 5:
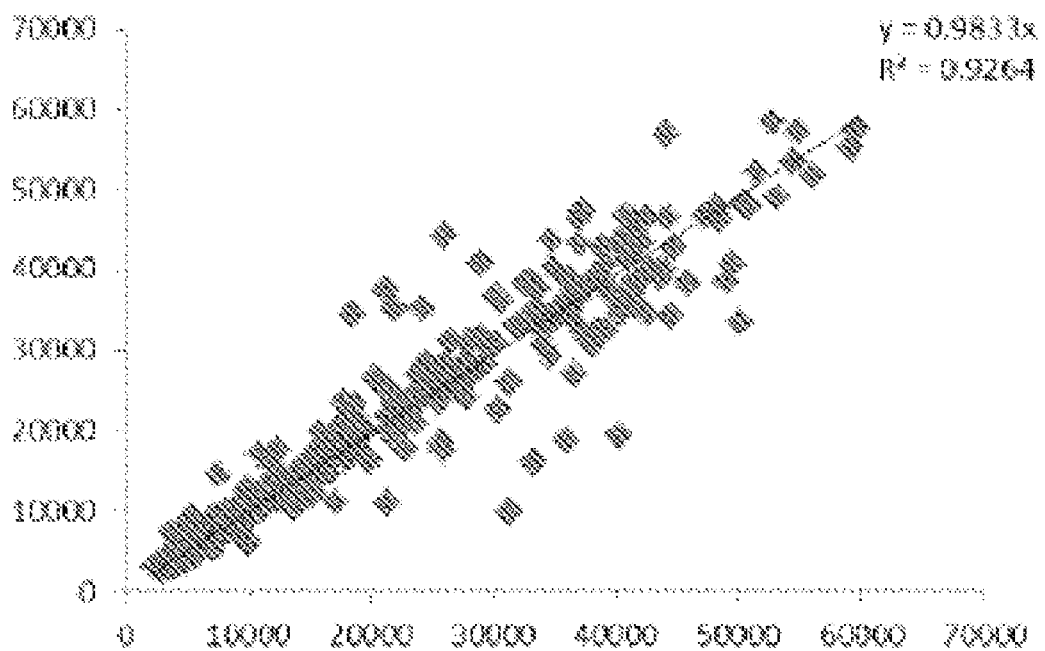
FIG. 5 illustrates a linear calibration relation diagram of a third group of parameters in Embodiment 1.

As can be seen from FIGS. 1-3, the correlation coefficient $R^2$ of the three groups of scanning parameters used by the scanner under test is greater than 0.90, which indicates that the calibration results of the scanner can be used normally.

TABLE 1

Phosphor Dot Signal Values of Three Groups of Scanning Parameters in Embodiments

| | Scanning parameters | | | | | |
|---|---|---|---|---|---|---|
| | Power-50 PMT-650 | | Power-60 PMT-650 | | Power-70 PMT-650 | |
| SN | Standard scanner | Scanner under test | Standard scanner | Scanner under test | Standard scanner | Scanner under test |
| 1 | 1799 | 1733 | 2323 | 2256 | 3063 | 2737 |
| 2 | 1650 | 1617 | 2296 | 2244 | 2965 | 3274 |
| 3 | 1620 | 1645 | 2012 | 2491 | 2766 | 2907 |
| 4 | 1556 | 1625 | 2386 | 2663 | 3064 | 3083 |
| 5 | 1670 | 2195 | 3089 | 2616 | 3274 | 3982 |
| 6 | 1675 | 2357 | 2908 | 2808 | 3320 | 4003 |
| 7 | 1572 | 1683 | 2194 | 2304 | 3078 | 3329 |
| 8 | 2086 | 1807 | 2885 | 2357 | 3225 | 3550 |
| 9 | 1986 | 2068 | 2554 | 2470 | 3368 | 3497 |
| 10 | 1859 | 1784 | 2333 | 2431 | 3154 | 3054 |
| 11 | 1739 | 1893 | 2615 | 2796 | 3478 | 3326 |
| 12 | 1927 | 1826 | 2147 | 2825 | 3242 | 3366 |
| 13 | 2484 | 2469 | 4531 | 3493 | 4542 | 4093 |

TABLE 1-continued

Phosphor Dot Signal Values of Three Groups of Scanning Parameters in Embodiments

| | Scanning parameters | | | | | |
|---|---|---|---|---|---|---|
| | Power-50 PMT-650 | | Power-60 PMT-650 | | Power-70 PMT-650 | |
| SN | Standard scanner | Scanner under test | Standard scanner | Scanner under test | Standard scanner | Scanner under test |
| 14 | 2655 | 2636 | 3457 | 4347 | 4545 | 4795 |
| 15 | 2487 | 3041 | 2965 | 3042 | 3903 | 4022 |
| 16 | 2604 | 2879 | 3928 | 4868 | 4405 | 4955 |
| 17 | 3124 | 2792 | 4671 | 5487 | 5309 | 9195 |
| 18 | 2705 | 3095 | 4154 | 5266 | 4928 | 4994 |
| 19 | 2471 | 2615 | 3449 | 4773 | 4437 | 4651 |
| 20 | 2953 | 2958 | 4959 | 5270 | 7260 | 7144 |
| 21 | 2205 | 2512 | 3332 | 3288 | 4435 | 4161 |
| 22 | 3722 | 3388 | 4381 | 4335 | 4601 | 4413 |
| 23 | 2354 | 3265 | 3745 | 3688 | 5628 | 4473 |
| 24 | 2815 | 3065 | 3886 | 3718 | 4331 | 4543 |
| 25 | 4870 | 6360 | 5384 | 8513 | 7212 | 9213 |
| 26 | 4112 | 4554 | 5216 | 5700 | 6937 | 7460 |
| 27 | 4036 | 4410 | 5813 | 8805 | 7586 | 7337 |
| 28 | 5356 | 4464 | 5752 | 5517 | 7716 | 7076 |
| 29 | 5241 | 4372 | 6959 | 8445 | 8817 | 8529 |
| 30 | 3995 | 4306 | 4962 | 5542 | 7401 | 7153 |
| 31 | 4920 | 4972 | 6691 | 8547 | 8592 | 8650 |
| 32 | 4672 | 9173 | 12170 | 8603 | 8607 | 8353 |
| 33 | 4220 | 4486 | 10419 | 6629 | 8115 | 8477 |
| 34 | 6114 | 6025 | 5748 | 6152 | 7508 | 7907 |
| 35 | 5028 | 6133 | 8058 | 8140 | 9042 | 7616 |
| 36 | 4681 | 4365 | 6532 | 7205 | 7881 | 8905 |
| 37 | 6120 | 5822 | 8108 | 7687 | 9699 | 10907 |
| 38 | 10934 | 6961 | 11282 | 15825 | 13038 | 11565 |
| 39 | 8624 | 7994 | 9934 | 9862 | 10036 | 12733 |
| 40 | 8246 | 6554 | 8840 | 8329 | 11629 | 11485 |
| 41 | 8060 | 11348 | 10710 | 11546 | 13715 | 10337 |
| 42 | 7885 | 7240 | 10745 | 11390 | 11408 | 11099 |
| 43 | 8628 | 8674 | 10928 | 11965 | 10983 | 10796 |
| 44 | 5976 | 5704 | 8246 | 11644 | 10504 | 10502 |
| 45 | 12741 | 6256 | 13259 | 17920 | 11592 | 12635 |
| 46 | 9278 | 12198 | 16058 | 9700 | 10650 | 10917 |
| 47 | 9036 | 12135 | 15561 | 10528 | 10634 | 10054 |
| 48 | 6657 | 12879 | 9768 | 8750 | 12549 | 11401 |
| 49 | 8453 | 12092 | 13070 | 10939 | 16270 | 15302 |
| 50 | 7545 | 7503 | 11243 | 11254 | 14460 | 15090 |
| 51 | 8344 | 8151 | 10554 | 10615 | 13845 | 13162 |
| 52 | 9276 | 8511 | 12227 | 10844 | 16521 | 14701 |
| 53 | 8562 | 8762 | 11550 | 11387 | 15078 | 14867 |
| 54 | 8356 | 8224 | 11275 | 10796 | 13819 | 14428 |
| 55 | 8568 | 8920 | 11668 | 11406 | 15778 | 15619 |
| 56 | 7916 | 8883 | 11005 | 10978 | 15254 | 15333 |
| 57 | 8999 | 9296 | 10649 | 10631 | 14191 | 14361 |
| 58 | 9874 | 9612 | 11629 | 12275 | 15639 | 17568 |
| 59 | 9129 | 10122 | 12289 | 13093 | 16548 | 16884 |
| 60 | 10733 | 10599 | 14891 | 13248 | 18263 | 18267 |
| 61 | 38366 | 16045 | 21195 | 19336 | 27069 | 25071 |
| 62 | 23983 | 24891 | 22010 | 20651 | 26093 | 25165 |
| 63 | 26615 | 30243 | 30238 | 44254 | 27815 | 28774 |
| 64 | 24565 | 22032 | 30970 | 20811 | 26790 | 26127 |
| 65 | 17457 | 19612 | 18293 | 23514 | 28098 | 26800 |
| 66 | 27238 | 28313 | 18204 | 18845 | 27692 | 24041 |
| 67 | 20949 | 22138 | 27935 | 28769 | 33843 | 32684 |
| 68 | 22115 | 16474 | 21013 | 24017 | 25165 | 24398 |
| 69 | 15125 | 17628 | 20254 | 24652 | 29081 | 27990 |
| 70 | 26219 | 25590 | 18792 | 21339 | 24492 | 28302 |
| 71 | 42416 | 35566 | 45691 | 35212 | 25961 | 44134 |
| 72 | 37649 | 38512 | 48892 | 52421 | 22793 | 21205 |
| 73 | 23761 | 37756 | 27543 | 28902 | 38512 | 32533 |
| 74 | 28791 | 29689 | 22884 | 28341 | 34533 | 29263 |
| 75 | 18470 | 22391 | 27611 | 26495 | 50121 | 33470 |
| 76 | 28142 | 20425 | 20601 | 25293 | 26389 | 31069 |
| 77 | 24740 | 23732 | 27883 | 31286 | 34552 | 43596 |
| 78 | 23178 | 28364 | 29677 | 33684 | 38998 | 40582 |
| 79 | 24154 | 26581 | 30711 | 31717 | 40356 | 34593 |
| 80 | 22360 | 24327 | 27849 | 26741 | 33047 | 38384 |
| 81 | 31279 | 25923 | 43138 | 38533 | 34892 | 40152 |
| 82 | 20891 | 25945 | 29080 | 32336 | 39048 | 32361 |
| 83 | 24349 | 35648 | 32298 | 46676 | 49393 | 40561 |
| 84 | 38186 | 28218 | 33163 | 35254 | 54399 | 53552 |
| 85 | 30598 | 37176 | 50734 | 41892 | 54873 | 57249 |
| 86 | 29300 | 37796 | 40919 | 40192 | 59717 | 57638 |
| 87 | 32005 | 33826 | 40658 | 42589 | 59163 | 55201 |
| 88 | 34667 | 35220 | 46130 | 43383 | 3450 | 3320 |
| 89 | 36201 | 36198 | 54657 | 51328 | 3223 | 3353 |
| 90 | 35683 | 36321 | 45791 | 46248 | 3415 | 3243 |
| 91 | 32309 | 31170 | 40986 | 44002 | 4591 | 3804 |
| 92 | 34466 | 32572 | 43755 | 42457 | 3070 | 3809 |
| 93 | 31159 | 37981 | 41879 | 45739 | 3438 | 3809 |
| 94 | 40769 | 34351 | 43126 | 44033 | 3360 | 3804 |
| 95 | 33358 | 33380 | 43014 | 45271 | 3546 | 3444 |
| 96 | 35551 | 39538 | 58941 | 56534 | 5004 | 3758 |
| 97 | 43156 | 46062 | 3493 | 2629 | 3226 | 2868 |
| 98 | 44509 | 45780 | 2552 | 3357 | 3575 | 4460 |
| 99 | 42281 | 46732 | 2719 | 2581 | 3034 | 3160 |
| 100 | 43389 | 45763 | 2756 | 2857 | 4762 | 4836 |
| 101 | 46681 | 48976 | 2749 | 2708 | 4502 | 5107 |
| 102 | 43585 | 47579 | 2545 | 2863 | 4281 | 7285 |
| 103 | 50871 | 51839 | 2464 | 2482 | 5423 | 4884 |
| 104 | 1930 | 1895 | 2493 | 2498 | 4318 | 5764 |
| 105 | 2009 | 2229 | 2830 | 3683 | 6009 | 6052 |
| 106 | 1800 | 1860 | 2424 | 2611 | 3491 | 4002 |
| 107 | 2577 | 2376 | 2962 | 2817 | 4265 | 5538 |
| 108 | 1797 | 2109 | 2156 | 2244 | 4429 | 4489 |
| 109 | 2001 | 1840 | 3456 | 3376 | 4136 | 5367 |
| 110 | 1760 | 2299 | 3421 | 3496 | 4440 | 4246 |
| 111 | 1784 | 1834 | 2958 | 4103 | 4104 | 4609 |
| 112 | 2014 | 2154 | 4338 | 3130 | 7747 | 8213 |
| 113 | 1871 | 1801 | 3496 | 4286 | 9494 | 10925 |
| 114 | 2354 | 2653 | 4836 | 4813 | 7340 | 7599 |
| 115 | 1545 | 1862 | 2861 | 2834 | 7777 | 8105 |
| 116 | 2472 | 2745 | 2962 | 3964 | 6748 | 6969 |
| 117 | 2681 | 3604 | 3617 | 3753 | 7280 | 8124 |
| 118 | 2734 | 2514 | 3970 | 3049 | 7757 | 7919 |
| 119 | 4205 | 6644 | 3418 | 3461 | 9802 | 5957 |
| 120 | 2192 | 2325 | 3142 | 3341 | 6959 | 7215 |
| 121 | 3353 | 3130 | 7731 | 6397 | 8267 | 9619 |
| 122 | 1952 | 2077 | 6463 | 5953 | 7574 | 6840 |
| 123 | 2318 | 4049 | 6689 | 5761 | 6384 | 6390 |
| 124 | 2488 | 2329 | 6778 | 5619 | 22781 | 17796 |
| 125 | 2738 | 2868 | 5091 | 5308 | 13626 | 12539 |
| 126 | 2273 | 2575 | 6863 | 5998 | 17083 | 11135 |
| 127 | 2983 | 2460 | 5566 | 5763 | 10134 | 11113 |
| 128 | 4412 | 6321 | 4578 | 5880 | 11760 | 11821 |
| 129 | 4453 | 4351 | 6830 | 5571 | 11743 | 12403 |
| 130 | 4985 | 5484 | 8075 | 6408 | 10663 | 11335 |
| 131 | 5032 | 5218 | 4894 | 5344 | 10903 | 17051 |
| 132 | 4309 | 3985 | 5758 | 5196 | 13641 | 12545 |
| 133 | 4910 | 5307 | 15944 | 13771 | 21556 | 21764 |
| 134 | 4177 | 4387 | 15077 | 11516 | 11040 | 10166 |
| 135 | 3387 | 3914 | 10800 | 9213 | 8174 | 8850 |
| 136 | 4061 | 5692 | 7575 | 8427 | 16908 | 18983 |
| 137 | 4265 | 6446 | 9461 | 9937 | 17849 | 17605 |
| 138 | 3330 | 3936 | 8429 | 8886 | 17934 | 16530 |
| 139 | 4376 | 4784 | 8783 | 8770 | 18904 | 18151 |
| 140 | 12702 | 10129 | 8914 | 13912 | 18385 | 19342 |
| 141 | 14643 | 15624 | 7425 | 9816 | 18391 | 19310 |
| 142 | 10773 | 7178 | 14639 | 22750 | 16167 | 16584 |
| 143 | 5752 | 6410 | 9809 | 14008 | 17060 | 17754 |
| 144 | 7495 | 6680 | 15987 | 7709 | 17054 | 19643 |
| 145 | 7179 | 7121 | 13500 | 14642 | 15414 | 13429 |
| 146 | 6323 | 6250 | 12834 | 13428 | 17757 | 21161 |
| 147 | 10332 | 8696 | 14120 | 14285 | 33270 | 16030 |
| 148 | 8109 | 8475 | 13266 | 14257 | 28835 | 31583 |
| 149 | 11113 | 10767 | 15488 | 16397 | 33466 | 37515 |

TABLE 1-continued

Phosphor Dot Signal Values of Three Groups of Scanning Parameters in Embodiments

| | Scanning parameters | | | | | |
|---|---|---|---|---|---|---|
| | Power-50 PMT-650 | | Power-60 PMT-650 | | Power-70 PMT-650 | |
| SN | Standard scanner | Scanner under test | Standard scanner | Scanner under test | Standard scanner | Scanner under test |
| 150 | 10461 | 10910 | 13682 | 14917 | 36133 | 34144 |
| 151 | 9937 | 18153 | 11823 | 12986 | 29194 | 28266 |
| 152 | 9724 | 10012 | 15686 | 13508 | 34732 | 33355 |
| 153 | 9610 | 9968 | 12147 | 14998 | 32378 | 33448 |
| 154 | 9702 | 10857 | 21741 | 12608 | 27718 | 28076 |
| 155 | 9586 | 11904 | 15611 | 16054 | 27124 | 27193 |
| 156 | 12046 | 12140 | 11667 | 14871 | 30086 | 30718 |
| 157 | 10239 | 11616 | 23499 | 22231 | 28910 | 31318 |
| 158 | 8508 | 9773 | 24956 | 28477 | 21476 | 24851 |
| 159 | 9747 | 10877 | 26267 | 24437 | 18409 | 34409 |
| 160 | 11971 | 11552 | 22436 | 22024 | 35256 | 34385 |
| 161 | 9098 | 17503 | 25303 | 26576 | 48361 | 46264 |
| 162 | 10931 | 11405 | 25200 | 23810 | 47241 | 46721 |
| 163 | 8058 | 17298 | 21112 | 21679 | 42063 | 43388 |
| 164 | 18859 | 20341 | 20338 | 22674 | 40979 | 41400 |
| 165 | 29425 | 19137 | 21282 | 24630 | 41467 | 37233 |
| 166 | 20226 | 20351 | 18630 | 34884 | 41755 | 38560 |
| 167 | 18952 | 18626 | 26526 | 19778 | 39665 | 36795 |
| 168 | 19309 | 24773 | 44832 | 49713 | 42675 | 40061 |
| 169 | 17249 | 17023 | 26463 | 28037 | 37936 | 30593 |
| 170 | 18866 | 16361 | 32877 | 32019 | 34046 | 30546 |
| 171 | 24717 | 19680 | 35109 | 36470 | 52772 | 58458 |
| 172 | 28167 | 19285 | 35159 | 34580 | 3174 | 4024 |
| 173 | 25036 | 26089 | 45366 | 41024 | 4489 | 4636 |
| 174 | 16105 | 14719 | 30955 | 34959 | 3490 | 3398 |
| 175 | 33195 | 36229 | 29348 | 30832 | 3579 | 3870 |
| 176 | 33455 | 25520 | 28890 | 35743 | 3633 | 4170 |
| 177 | 38460 | 24188 | 34470 | 25861 | 3967 | 3659 |
| 178 | 29567 | 39267 | 36956 | 31243 | 3426 | 3302 |
| 179 | 22805 | 27705 | 23245 | 29333 | 3632 | 3439 |
| 180 | 31001 | 28154 | 25053 | 23692 | 3624 | 3062 |
| 181 | 25498 | 23791 | 47336 | 56550 | 4059 | 3305 |
| 182 | 26524 | 22891 | 52181 | 58569 | 3814 | 3545 |
| 183 | 24545 | 23641 | 54413 | 57059 | 3333 | 3352 |
| 184 | 24965 | 20731 | 57483 | 58546 | 3953 | 3734 |
| 185 | 21889 | 27093 | 52160 | 57841 | 3803 | 4411 |
| 186 | 18688 | 31066 | 46819 | 50865 | 4161 | 4647 |
| 187 | 21393 | 15904 | 45645 | 48782 | 5023 | 5187 |
| 188 | 47697 | 37336 | 44612 | 44790 | 4326 | 4380 |
| 189 | 46404 | 41095 | 47366 | 45604 | 7048 | 5040 |
| 190 | 40426 | 45284 | 46142 | 42320 | 5853 | 5511 |
| 191 | 43429 | 46726 | 38343 | 47287 | 4906 | 4783 |
| 192 | 38448 | 41336 | 54471 | 59680 | 6023 | 5704 |
| 193 | 38788 | 41298 | 2309 | 2372 | 5630 | 5641 |
| 194 | 34484 | 36844 | 3222 | 3101 | 5775 | 5807 |
| 195 | 34522 | 39251 | 2426 | 2588 | 4664 | 4747 |
| 196 | 29412 | 33522 | 2732 | 2601 | 7361 | 6828 |
| 197 | 32485 | 36987 | 2862 | 2868 | 9349 | 7473 |
| 198 | 29995 | 32183 | 2475 | 2671 | 7251 | 7277 |
| 199 | 29249 | 35975 | 2325 | 2329 | 8128 | 8201 |
| 200 | 45936 | 49706 | 2572 | 2545 | 8017 | 8185 |
| 201 | 41811 | 45320 | 2464 | 2469 | 8126 | 7468 |
| 202 | 2093 | 1797 | 2502 | 2614 | 9437 | 8969 |
| 203 | 2392 | 2531 | 2856 | 2695 | 9220 | 9099 |
| 204 | 1839 | 2016 | 2785 | 2466 | 8019 | 7564 |
| 205 | 2177 | 2424 | 2813 | 2909 | 8590 | 8445 |
| 206 | 2296 | 2774 | 2945 | 3093 | 9058 | 8730 |
| 207 | 1885 | 2143 | 3036 | 3408 | 9403 | 10758 |
| 208 | 1812 | 1671 | 4385 | 3506 | 21329 | 10886 |
| 209 | 2413 | 2115 | 3495 | 3594 | 11623 | 13107 |
| 210 | 1813 | 2350 | 5167 | 4773 | 10122 | 10425 |
| 211 | 1685 | 1853 | 4521 | 4341 | 12847 | 12187 |
| 212 | 2435 | 1821 | 3626 | 3511 | 12201 | 11540 |
| 213 | 1902 | 2078 | 4333 | 3983 | 12463 | 12949 |
| 214 | 2191 | 2253 | 4251 | 4000 | 12708 | 12552 |
| 215 | 2621 | 2476 | 4103 | 4420 | 12684 | 12815 |
| 216 | 2289 | 2696 | 3704 | 3794 | 12749 | 12317 |
| 217 | 3668 | 2552 | 5452 | 6596 | 13462 | 13088 |
| 218 | 2479 | 2520 | 5255 | 6121 | 14483 | 13785 |
| 219 | 3963 | 4041 | 8729 | 5694 | 12343 | 17587 |
| 220 | 3249 | 3042 | 6496 | 6348 | 18833 | 21607 |
| 221 | 2544 | 2630 | 6081 | 6246 | 19580 | 19887 |
| 222 | 4253 | 3394 | 6303 | 5683 | 23594 | 23123 |
| 223 | 3030 | 3051 | 7013 | 6974 | 22954 | 21225 |
| 224 | 3482 | 3169 | 6802 | 6991 | 21972 | 21541 |
| 225 | 2554 | 2910 | 6047 | 6042 | 21726 | 21225 |
| 226 | 4542 | 3638 | 6513 | 6524 | 25566 | 25639 |
| 227 | 4712 | 4876 | 6734 | 7429 | 24079 | 26245 |
| 228 | 4154 | 4197 | 6997 | 7146 | 24471 | 26238 |
| 229 | 4716 | 4581 | 10599 | 8065 | 21661 | 23173 |
| 230 | 4340 | 4692 | 9515 | 9715 | 23750 | 27026 |
| 231 | 4514 | 4796 | 8096 | 8023 | 19646 | 20013 |
| 232 | 5302 | 5241 | 9243 | 9573 | 42626 | 34420 |
| 233 | 4846 | 4971 | 8863 | 9067 | 36540 | 37515 |
| 234 | 4436 | 4371 | 9573 | 9895 | 45940 | 38380 |
| 235 | 4738 | 4697 | 9615 | 9659 | 43606 | 39059 |
| 236 | 4689 | 5202 | 9439 | 9812 | 31845 | 32886 |
| 237 | 5070 | 5787 | 10401 | 9758 | 41345 | 44709 |
| 238 | 12523 | 11664 | 9370 | 8960 | 37247 | 32310 |
| 239 | 6533 | 9030 | 10731 | 10769 | 41017 | 37888 |
| 240 | 5983 | 6137 | 10421 | 11115 | 49047 | 38512 |
| 241 | 6908 | 7142 | 14698 | 16309 | 40933 | 42094 |
| 242 | 6698 | 6711 | 14169 | 14788 | 36855 | 36313 |
| 243 | 7213 | 7274 | 17047 | 17896 | 30509 | 35893 |
| 244 | 7164 | 7178 | 18267 | 16617 | 53126 | 49099 |
| 245 | 7863 | 7783 | 18209 | 16687 | 50472 | 48302 |
| 246 | 7928 | 7961 | 17391 | 16491 | 2944 | 3123 |
| 247 | 7091 | 9088 | 19624 | 20910 | 2517 | 2986 |
| 248 | 7094 | 7805 | 17019 | 20570 | 2758 | 3280 |
| 249 | 6986 | 7567 | 18138 | 19971 | 3627 | 3521 |
| 250 | 11239 | 11228 | 14767 | 16689 | 3570 | 4127 |
| 251 | 10602 | 11231 | 17372 | 21274 | 3126 | 3855 |
| 252 | 14065 | 13283 | 13885 | 15093 | 3283 | 3732 |
| 253 | 12944 | 13116 | 21221 | 24639 | 2619 | 2966 |
| 254 | 12824 | 12395 | 26540 | 29789 | 3671 | 3499 |
| 255 | 14123 | 12103 | 34232 | 28808 | 3664 | 3292 |
| 256 | 14888 | 15485 | 29222 | 30156 | 3383 | 3043 |
| 257 | 13324 | 14194 | 23984 | 25377 | 3605 | 3239 |
| 258 | 13100 | 13716 | 31884 | 35404 | 3535 | 4076 |
| 259 | 12895 | 11949 | 27379 | 26616 | 4740 | 4249 |
| 260 | 13450 | 15447 | 35568 | 32183 | 4807 | 5227 |
| 261 | 10626 | 12017 | 30817 | 28375 | 4003 | 3782 |
| 262 | 17321 | 18481 | 31811 | 33156 | 4699 | 4115 |
| 263 | 20343 | 21656 | 31444 | 28212 | 3915 | 4263 |
| 264 | 25399 | 26307 | 22225 | 25590 | 4321 | 4487 |
| 265 | 21743 | 23115 | 40606 | 36914 | 5179 | 5268 |
| 266 | 23024 | 21392 | 38640 | 38265 | 5337 | 5257 |
| 267 | 25791 | 27007 | 47251 | 49289 | 4605 | 4910 |
| 268 | 19672 | 21336 | 42909 | 45305 | 4651 | 5651 |
| 269 | 26010 | 24893 | 47645 | 49820 | 4781 | 4401 |
| 270 | 23159 | 24510 | 52405 | 43475 | 8671 | 8945 |
| 271 | 23431 | 24563 | 44637 | 44806 | 7635 | 8485 |
| 272 | 28576 | 24487 | 41782 | 43850 | 7473 | 6687 |
| 273 | 26191 | 20917 | 48355 | 37008 | 7288 | 8785 |
| 274 | 30329 | 33151 | 39244 | 50720 | 8037 | 7554 |
| 275 | 33932 | 31209 | 38374 | 36030 | 6777 | 7899 |
| 276 | 31843 | 35532 | 2278 | 2605 | 8758 | 8630 |
| 277 | 34626 | 40100 | 2193 | 2228 | 7838 | 7649 |
| 278 | 31996 | 41762 | 2268 | 2813 | 6959 | 8008 |
| 279 | 34439 | 36968 | 2548 | 2584 | 8315 | 10083 |
| 280 | 40104 | 37090 | 2615 | 2631 | 7422 | 7832 |
| 281 | 33145 | 36209 | 2507 | 2966 | 7857 | 7933 |
| 282 | 31217 | 39899 | 2446 | 2551 | 12582 | 11701 |
| 283 | 33933 | 37800 | 2295 | 2308 | 11426 | 10805 |
| 284 | 29063 | 33897 | 2607 | 2535 | 14554 | 11451 |
| 285 | 27721 | 29985 | 3084 | 2466 | 14329 | 14310 |

TABLE 1-continued

Phosphor Dot Signal Values of Three Groups of Scanning Parameters in Embodiments

| | Scanning parameters | | | | | |
|---|---|---|---|---|---|---|
| | Power-50 PMT-650 | | Power-60 PMT-650 | | Power-70 PMT-650 | |
| SN | Standard scanner | Scanner under test | Standard scanner | Scanner under test | Standard scanner | Scanner under test |
| 286 | 52051 | 49165 | 2505 | 2259 | 12410 | 12589 |
| 287 | 1971 | 1716 | 2333 | 2264 | 12063 | 15418 |
| 288 | 1658 | 1787 | 2577 | 3196 | 12577 | 11427 |
| 289 | 2323 | 2021 | 3663 | 3284 | 13197 | 13438 |
| 290 | 1989 | 1855 | 3464 | 3882 | 11775 | 11576 |
| 291 | 1919 | 1996 | 3058 | 3011 | 14280 | 12523 |
| 292 | 1803 | 1975 | 3381 | 3255 | 15190 | 12127 |
| 293 | 1890 | 1687 | 3790 | 3418 | 23597 | 20941 |
| 294 | 1533 | 1621 | 3084 | 3213 | 40255 | 19295 |
| 295 | 1975 | 2102 | 3649 | 4002 | 21887 | 21080 |
| 296 | 1701 | 1952 | 5167 | 4612 | 21554 | 22150 |
| 297 | 2141 | 1719 | 3478 | 3818 | 22710 | 23622 |
| 298 | 1907 | 1840 | 3534 | 3474 | 19141 | 19470 |
| 299 | 2309 | 2365 | 3560 | 3479 | 24397 | 27102 |
| 300 | 2416 | 2844 | 7061 | 6056 | 26034 | 28319 |
| 301 | 2636 | 2944 | 5454 | 5625 | 25429 | 23260 |
| 302 | 2300 | 2392 | 5684 | 6116 | 21654 | 22105 |
| 303 | 2462 | 2535 | 5992 | 5953 | 23534 | 22988 |
| 304 | 2387 | 2506 | 5946 | 5592 | 22861 | 21322 |
| 305 | 2421 | 2570 | 5699 | 5245 | 17424 | 17306 |
| 306 | 2827 | 2988 | 6504 | 6330 | 41581 | 46256 |
| 307 | 3754 | 2928 | 5913 | 5911 | 35543 | 35444 |
| 308 | 2500 | 2807 | 5196 | 5575 | 33521 | 35214 |
| 309 | 2585 | 2566 | 5961 | 6437 | 36314 | 35908 |
| 310 | 2559 | 2797 | 5363 | 5403 | 40246 | 43404 |
| 311 | 4062 | 6502 | 6440 | 7582 | 36948 | 46508 |
| 312 | 4984 | 5023 | 9502 | 9419 | 36944 | 43263 |
| 313 | 4327 | 5510 | 10393 | 8156 | 41561 | 35725 |
| 314 | 4117 | 4279 | 10854 | 9450 | 37177 | 37752 |
| 315 | 4943 | 4835 | 10930 | 10256 | 38776 | 42800 |
| 316 | 4042 | 4138 | 9446 | 9506 | 36297 | 34980 |
| 317 | 4968 | 5139 | 10034 | 11743 | 28026 | 30902 |
| 318 | 4301 | 4685 | 9185 | 10316 | 50801 | 47896 |
| 319 | 4202 | 4639 | 9588 | 10255 | 55964 | 51602 |
| 320 | 4441 | 5053 | 9189 | 9731 | 51406 | 52235 |
| 321 | 4205 | 3902 | 9153 | 9178 | 44690 | 42771 |
| 322 | 6400 | 5922 | 10984 | 11820 | 36158 | 38786 |
| 323 | 6358 | 8072 | 17034 | 17646 | 3467 | 3141 |
| 324 | 6993 | 6290 | 31046 | 23978 | 3982 | 3268 |
| 325 | 6854 | 7039 | 16527 | 22285 | 3710 | 3594 |
| 326 | 9099 | 8765 | 20120 | 16351 | 3051 | 3052 |
| 327 | 8463 | 6965 | 17952 | 18221 | 3217 | 3238 |
| 328 | 7455 | 8289 | 15638 | 17146 | 3046 | 2949 |
| 329 | 6687 | 7227 | 18481 | 18748 | 2881 | 2716 |
| 330 | 7085 | 7814 | 23890 | 20009 | 4011 | 4969 |
| 331 | 8770 | 9006 | 19375 | 19286 | 2932 | 2620 |
| 332 | 7399 | 9909 | 16530 | 16849 | 3208 | 3350 |
| 333 | 7901 | 7342 | 17965 | 20079 | 3519 | 3316 |
| 334 | 22907 | 16362 | 16543 | 15746 | 2401 | 3107 |
| 335 | 15751 | 22726 | 36478 | 33569 | 4135 | 5041 |
| 336 | 15570 | 16635 | 31765 | 35152 | 4885 | 5752 |
| 337 | 12781 | 13011 | 36315 | 36018 | 4666 | 337 |
| 338 | 13672 | 13277 | 30144 | 32714 | 5754 | 6049 |
| 339 | 17435 | 17142 | 27428 | 27353 | 3765 | 4011 |
| 340 | 14697 | 14230 | 37261 | 30460 | 4312 | 4782 |
| 341 | 17796 | 15217 | 27990 | 28725 | 4548 | 4159 |
| 342 | 13395 | 14136 | 35079 | 36653 | 3807 | 3899 |
| 343 | 12606 | 15048 | 30781 | 32399 | 4182 | 3966 |
| 344 | 15715 | 15909 | 27381 | 29021 | 4218 | 4848 |
| 345 | 12910 | 13696 | 29786 | 30415 | 3872 | 3867 |
| 346 | 25627 | 27416 | 27877 | 27452 | 3845 | 7161 |
| 347 | 24722 | 22887 | 25563 | 23460 | 10064 | 10340 |
| 348 | 27366 | 26884 | 41818 | 36301 | 7590 | 7035 |
| 349 | 24809 | 18666 | 40671 | 38893 | 6355 | 6897 |
| 350 | 24403 | 27033 | 46140 | 46024 | 6885 | 7642 |
| 351 | 26586 | 28175 | 45898 | 44849 | 5493 | 7732 |
| 352 | 22418 | 27976 | 47320 | 51014 | 8261 | 7570 |
| 353 | 22474 | 26475 | 35344 | 48659 | 7505 | 7836 |
| 354 | 23866 | 24722 | 44293 | 46712 | 6949 | 7611 |
| 355 | 20160 | 27108 | 47391 | 42054 | 6760 | 7743 |
| 356 | 23027 | 28684 | 44504 | 49079 | 6431 | 6936 |
| 357 | 28949 | 28532 | 39689 | 47275 | 7861 | 8533 |
| 358 | 31793 | 33803 | 32249 | 41165 | 7486 | 14401 |
| 359 | 32413 | 33060 | 26972 | 29290 | 22032 | 24141 |
| 360 | 33675 | 34775 | 2028 | 2736 | 25797 | 18417 |
| 361 | 37668 | 35829 | 2869 | 3126 | 13311 | 11788 |
| 362 | 33500 | 33735 | 2745 | 3060 | 11333 | 11945 |
| 363 | 35491 | 37729 | 3042 | 2813 | 9023 | 8475 |
| 364 | 34786 | 35070 | 2397 | 2367 | 10070 | 9581 |
| 365 | 33226 | 34848 | 2264 | 2396 | 11346 | 12780 |
| 366 | 35357 | 35645 | 2459 | 2557 | 10424 | 9526 |
| 367 | 33256 | 35885 | 3090 | 3668 | 11102 | 10295 |
| 368 | 35529 | 35814 | 2109 | 2372 | 9985 | 10679 |
| 369 | 30402 | 32503 | 2944 | 2648 | 9404 | 11022 |
| 370 | 22798 | 31032 | 2134 | 2659 | 31267 | 9783 |
| 371 | 52198 | 55451 | 2316 | 2540 | 35864 | 18799 |
| 372 | 1674 | 1809 | 3200 | 4514 | 15915 | 19779 |
| 373 | 1962 | 2303 | 4171 | 4141 | 44422 | 34113 |
| 374 | 2168 | 2001 | 3488 | 3590 | 17821 | 17638 |
| 375 | 1726 | 1944 | 3606 | 3919 | 15271 | 16641 |
| 376 | 1907 | 2004 | 3724 | 3343 | 19894 | 16267 |
| 377 | 1866 | 1857 | 3285 | 3244 | 25934 | 17511 |
| 378 | 1772 | 1810 | 2845 | 3423 | 17746 | 23547 |
| 379 | 1959 | 1781 | 2844 | 3739 | 18365 | 20854 |
| 380 | 1410 | 1588 | 3043 | 3891 | 21608 | 19647 |
| 381 | 1705 | 1867 | 3374 | 3600 | 18707 | 23338 |
| 382 | 2042 | 1616 | 2754 | 4132 | 36517 | 26962 |
| 383 | 1552 | 1525 | 2882 | 2803 | 25627 | 25808 |
| 384 | 2065 | 2380 | 7732 | 7662 | 23233 | 23928 |
| 385 | 3188 | 6022 | 5926 | 6054 | 21119 | 37515 |
| 386 | 2489 | 2441 | 6301 | 6522 | 21852 | 35222 |
| 387 | 2552 | 3240 | 5613 | 5827 | 20342 | 26507 |
| 388 | 2226 | 2255 | 4938 | 6378 | 24185 | 27127 |
| 389 | 2438 | 2698 | 7620 | 5772 | 28890 | 40809 |
| 390 | 2555 | 2837 | 5798 | 5911 | 30145 | 36790 |
| 391 | 2164 | 2802 | 4952 | 5486 | 31316 | 25978 |
| 392 | 2374 | 2831 | 4973 | 5927 | 30390 | 22610 |
| 393 | 1965 | 3291 | 6681 | 6319 | 25470 | 26708 |
| 394 | 2731 | 2464 | 6246 | 6463 | 24227 | 35178 |
| 395 | 1887 | 2021 | 10226 | 15359 | 48290 | 47862 |
| 396 | 5825 | 6157 | 18710 | 33757 | 38364 | 38969 |
| 397 | 4234 | 4250 | 12680 | 32805 | 43748 | 39977 |
| 398 | 6436 | 5261 | 15404 | 13549 | 38817 | 38453 |
| 399 | 5265 | 4824 | 9294 | 9656 | 44023 | 56818 |
| 400 | 4553 | 4984 | 8274 | 12477 | 32572 | 38454 |
| 401 | 8986 | 6036 | 7790 | 8030 | 37202 | 47250 |
| 402 | 4095 | 4428 | 10754 | 9514 | 40738 | 46635 |
| 403 | 3865 | 3877 | 8835 | 10017 | 44210 | 46358 |
| 404 | 3754 | 4405 | 8868 | 9439 | 42593 | 46665 |
| 405 | 4787 | 4862 | 8296 | 8540 | 38521 | 39406 |
| 406 | 4167 | 5507 | 10395 | 13585 | 41180 | 44493 |
| 407 | 9678 | 9194 | 28483 | 22801 | | |
| 408 | 24014 | 25461 | 35533 | 26740 | | |
| 409 | 18681 | 22882 | 19955 | 28978 | | |
| 410 | 11098 | 11616 | 32391 | 51787 | | |
| 411 | 9381 | 7817 | 13059 | 18631 | | |
| 412 | 9795 | 9525 | 12501 | 18072 | | |
| 413 | 14373 | 5870 | 22588 | 18616 | | |
| 414 | 8782 | 7693 | 21070 | 22759 | | |
| 415 | 10686 | 7124 | 20142 | 18421 | | |
| 416 | 9866 | 18487 | 14761 | 17301 | | |
| 417 | 7556 | 5626 | 17019 | 16041 | | |
| 418 | 9793 | 16247 | 14665 | 15483 | | |
| 419 | 20884 | 15344 | 52436 | 19369 | | |
| 420 | 25569 | 32326 | 19758 | 29359 | | |
| 421 | 24838 | 26582 | 20803 | 38223 | | |

TABLE 1-continued

Phosphor Dot Signal Values of Three Groups of Scanning Parameters in Embodiments

| | Scanning parameters | | | | | |
|---|---|---|---|---|---|---|
| | Power-50 PMT-650 | | Power-60 PMT-650 | | Power-70 PMT-650 | |
| SN | Standard scanner | Scanner under test | Standard scanner | Scanner under test | Standard scanner | Scanner under test |
| 422 | 37987 | 24627 | 18814 | 20202 | | |
| 423 | 14020 | 10009 | 16693 | 26949 | | |
| 424 | 20740 | 10028 | 17117 | 30679 | | |
| 425 | 25963 | 26391 | 21341 | 28189 | | |
| 426 | 24189 | 13377 | 23287 | 31265 | | |
| 427 | 16172 | 23038 | 22903 | 28379 | | |
| 428 | 11663 | 23213 | 24400 | 27516 | | |
| 429 | 15276 | 13461 | 21806 | 22874 | | |
| 430 | 23333 | 15821 | 19554 | 21837 | | |
| 431 | 37910 | 46013 | 21143 | 26918 | | |
| 432 | 32561 | 23660 | 35404 | 44478 | | |
| 433 | 21959 | 44078 | 29352 | 34984 | | |
| 434 | 19679 | 14133 | 30810 | 33668 | | |
| 435 | 13063 | 18475 | 29040 | 31684 | | |
| 436 | 13482 | 14279 | 33813 | 43989 | | |
| 437 | 18820 | 16672 | 25198 | 29394 | | |
| 438 | 21988 | 23506 | 28998 | 38799 | | |
| 439 | 16770 | 22006 | 38326 | 35995 | | |
| 440 | 15265 | 20560 | 34114 | 34907 | | |
| 441 | 16606 | 17277 | 32263 | 35634 | | |
| 442 | 13898 | 14878 | 30390 | 29595 | | |
| 443 | 17801 | 22038 | 31716 | 33363 | | |
| 444 | 28508 | 37134 | 55452 | 56838 | | |
| 445 | 35037 | 26297 | 50946 | 53742 | | |
| 446 | 24727 | 32378 | | | | |
| 447 | 21459 | 24798 | | | | |
| 448 | 25014 | 34431 | | | | |
| 449 | 20257 | 29045 | | | | |
| 450 | 27659 | 29953 | | | | |
| 451 | 26341 | 27956 | | | | |
| 452 | 28270 | 27015 | | | | |
| 453 | 27503 | 26752 | | | | |
| 454 | 20628 | 22104 | | | | |
| 455 | 22539 | 24630 | | | | |
| 456 | 49297 | 50267 | | | | |
| 457 | 44356 | 44903 | | | | |
| 458 | 40238 | 42540 | | | | |
| 459 | 40096 | 41393 | | | | |
| 460 | 40294 | 41249 | | | | |
| 461 | 38452 | 46323 | | | | |
| 462 | 45376 | 49871 | | | | |
| 463 | 49667 | 51487 | | | | |
| 464 | 34805 | 48789 | | | | |
| 465 | 36111 | 38789 | | | | |

The present invention is not limited to the foregoing specific implementations. The present invention expands to any new feature or any new combination disclosed in the Description, and steps in any new method or process or any new combination disclosed.

The invention claimed is:

1. A concentration gradient fluorescence calibration sheet for a laser microarray chip scanner, characterized in that the concentration gradient fluorescence calibration sheet comprises a glass substrate and an inorganic nano fluorescent liquid lattice disposed on a surface of the glass substrate; the inorganic nano fluorescent liquid lattice comprises a plurality of inorganic nano fluorescent liquid sub-lattices; inorganic fluorescent mixed liquid droplets of each inorganic nano fluorescent liquid sub-lattice are arranged in A rows×B columns, a solution concentration of the same row of inorganic nano fluorescent liquid droplets in the inorganic nano fluorescent liquid sub-lattices is the same, and the solution concentrations of two adjacent rows of inorganic nano fluorescent liquid droplets increase or decrease gradiently in multiples, wherein A is 5-20, and B is 10-40.

2. The concentration gradient fluorescence calibration sheet for the laser microarray chip scanner according to claim 1, characterized in that the glass substrate is chemically modified or coated with a polymeric membrane on a surface thereof.

3. The concentration gradient fluorescence calibration sheet for the laser microarray chip scanner according to claim 1, characterized in that the inorganic nano fluorescent liquid lattice comprises 1-8 inorganic nano fluorescent liquid sub-lattices which are uniformly distributed and arranged on the glass substrate.

4. The concentration gradient fluorescence calibration sheet for the laser microarray chip scanner according to claim 1, characterized in that an array spacing between the adjacent inorganic nano fluorescent liquid sub-lattices is the same, and a dot spacing between the adjacent inorganic nano fluorescent liquid sub-lattices is the same and is greater than or equal to 350 μm.

5. The concentration gradient fluorescence calibration sheet for the laser microarray chip scanner according to claim 1, characterized in that the solution concentrations of a first row of inorganic nano fluorescent liquid droplets and a last row of inorganic nano fluorescent liquid droplets in the inorganic nano fluorescent liquid sub-lattice are maximum, the solution concentrations have a linear relation of increasing in positive multiples from a second row of inorganic nano fluorescent liquid droplets to the last but one inorganic nano fluorescent liquid droplets, and a concentration gradient of the solution in the same inorganic nano fluorescent liquid sub-lattice is smaller than or equal to 12 concentration gradients.

6. The concentration gradient fluorescence calibration sheet for the laser microarray chip scanner according to claim 5, characterized in that the phosphor dot signal values of the first row of inorganic nano fluorescent liquid droplets and a last row of inorganic nano fluorescent liquid droplets are 65535 maximally, a phosphor dot signal value of the second row of inorganic nano fluorescent liquid droplets is 1000-3000, and a phosphor dot signal value of the last but one inorganic nano fluorescent liquid droplets is 60000-65535.

7. A calibration method for a laser microarray chip scanner, characterized in that a concentration gradient fluorescence calibration sheet for the laser microarray chip scanner according to claim 1 is utilized to calibrate a scanner under test, and a first row of inorganic nano fluorescent liquid droplets in the inorganic nano fluorescent liquid sub-lattices are taken as index marks.

8. The calibration method for the laser microarray chip scanner according to claim 7, characterized in that a phosphor dot signal value of every inorganic nano fluorescent liquid droplet in the inorganic nano fluorescent liquid sub-lattice is taken as a single measurement value of a corresponding solution concentration, a diagram is made by taking a logarithmic value of the phosphor dot signal value of the corresponding every inorganic nano fluorescent liquid droplet thereof as a horizontal ordinate after the concentration gradient fluorescence calibration sheet is scanned by a standard scanner, and taking a logarithmic value of the phosphor dot signal value of the corresponding every inorganic nano fluorescent liquid droplet thereof as a longitudinal coordinate after the concentration gradient fluorescence calibration sheet is scanned by a scanner under test, and a correlation coefficient R2 of a linear relation of a curve obtained from the diagram is obtained through investigation.

9. The calibration method for the laser microarray chip scanner according to claim 8, characterized in that every scanner under test is calibrated by at least three groups of different scanning parameters, and when a correlation coefficient R2 of every group of scanning parameters is greater than 0.90, the scanner under test has a normal calibration result and can be used in good condition.

\* \* \* \* \*